United States Patent
Marotzke

(10) Patent No.: US 9,499,191 B2
(45) Date of Patent: Nov. 22, 2016

(54) SUPERPOSITION DRIVE FOR A SUPERIMPOSED STEERING SYSTEM OF A MOTOR VEHICLE

(71) Applicant: TAKATA AG, Aschaffenburg (DE)

(72) Inventor: Thomas Marotzke, Bergfelde (DE)

(73) Assignee: TAKATA AG (DE)

( * ) Notice: Subject to any disclaimer, the term of this patent is extended or adjusted under 35 U.S.C. 154(b) by 30 days.

(21) Appl. No.: 14/410,034

(22) PCT Filed: Jun. 20, 2013

(86) PCT No.: PCT/EP2013/062893
§ 371 (c)(1),
(2) Date: Dec. 19, 2014

(87) PCT Pub. No.: WO2013/190045
PCT Pub. Date: Dec. 27, 2013

(65) Prior Publication Data
US 2015/0144416 A1    May 28, 2015

(30) Foreign Application Priority Data
Jun. 22, 2012 (DE) .................. 10 2012 210 640 U

(51) Int. Cl.
*B62D 3/04* (2006.01)
*B62D 5/04* (2006.01)
(Continued)

(52) U.S. Cl.
CPC . *B62D 3/04* (2013.01); *B62D 1/10* (2013.01); *B62D 5/00* (2013.01); *B62D 5/008* (2013.01); *Y10T 74/19828* (2015.01)

(58) Field of Classification Search
CPC ...... B62D 7/226; B62D 5/0454; F16H 55/24
USPC ................................................ 180/443, 444
See application file for complete search history.

(56) References Cited

U.S. PATENT DOCUMENTS 6,491,131 B1 * 12/2002 Appleyard ........... B62D 5/0409
                                                            180/444
6,900,564 B2 * 5/2005 Kobayashi ........... B62D 5/0409
                                                            180/444
(Continued)

FOREIGN PATENT DOCUMENTS

DE    10 2006 013 2888 A1    9/2007
EP         1 873 041 A1      1/2008
(Continued)

OTHER PUBLICATIONS

International Search Report date of mailing Feb. 19, 2014 for PCT/EP2013/062893. (4 pages).
(Continued)

*Primary Examiner* — Tony Winner
(74) *Attorney, Agent, or Firm* — Fitch Even Tabin & Flannery LLP

(57) ABSTRACT

The invention relates to a superposition drive for a superimposed steering system of a motor vehicle, with a drive shaft and a drive gear cooperating with the drive shaft, wherein the drive shaft is pivotally mounted with respect to the drive gear. A lever element pivotally mounted with respect to the drive gear, which is designed and arranged such that pivoting of the lever element entails pivoting of the drive shaft or vice versa pivoting of the drive shaft entails pivoting of the lever element, is provided.

14 Claims, 2 Drawing Sheets

(51) Int. Cl.
*B62D 1/10* (2006.01)
*B62D 5/00* (2006.01)

(56) References Cited

U.S. PATENT DOCUMENTS

| | | | |
|---|---|---|---|
| 7,726,439 B2 * | 6/2010 | Akuta | B62D 3/12 180/402 |
| 8,336,412 B1 * | 12/2012 | Ishii | B62D 5/0409 180/444 |
| 2002/0121401 A1 * | 9/2002 | Shimizu | B62D 5/0409 180/444 |
| 2002/0189892 A1 | 12/2002 | Appleyard | |
| 2003/0146039 A1 * | 8/2003 | Sano | B62D 5/0409 180/444 |
| 2007/0034442 A1 * | 2/2007 | Inoue | B62D 5/008 180/444 |
| 2008/0006471 A1 | 1/2008 | Nakamura | |
| 2011/0155499 A1 * | 6/2011 | Wilkes | B62D 5/0409 180/444 |
| 2012/0024617 A1 | 2/2012 | Markfort | |
| 2012/0217085 A1 * | 8/2012 | Sekikawa | B62D 5/0409 180/444 |
| 2014/0000976 A1 * | 1/2014 | Markfort | B62D 1/10 180/444 |
| 2016/0068184 A1 * | 3/2016 | Kimoto | B62D 5/0454 180/444 |

FOREIGN PATENT DOCUMENTS

| | | |
|---|---|---|
| JP | 2002518242 | 6/2002 |
| JP | 2008184031 | 8/2008 |
| WO | 99/65758 A1 | 12/1999 |
| WO | 2010/115707 A1 | 10/2010 |

OTHER PUBLICATIONS

Office Action issued in corresponding Japanese Application No. 2015-517766 dated Mar. 1, 2016 (8 pages) with English Translation.

* cited by examiner

SUPERPOSITION DRIVE FOR A SUPERIMPOSED STEERING SYSTEM OF A MOTOR VEHICLE

CROSS-REFERENCE TO RELATED APPLICATIONS

This application is a U.S. National Phase Patent Application of International Patent Application Number PCT/EP2013/062893, filed on Jun. 20, 2013, which claims priority of German Patent Application Number 10 2012 210 645.5, filed Jun. 22, 2012, which are hereby incorporated herein by reference in their entirety.

BACKGROUND

This invention relates to a superposition drive for a superimposed steering system of a motor vehicle.

From the prior art, steering wheels which realize a superimposed steering system are known. Such steering wheels include a superposition drive for generating a steering angle which is superimposed with a steering angle generated by the driver by actuating the steering wheel rim of the steering wheel, so that a rotary movement of a steering shaft connected with the steering wheel is composed of the steering angle generated by the driver and the steering angle generated by the superposition drive Due to manufacture, the parts of the superimposed steering system have certain tolerances whose minimization involves considerable costs. During assembly of the individual parts, these tolerances add up, which results in deviations in the engagement of transmission components of the superposition drive. The cooperation of the transmission components also can change during operation of the superimposed steering system, in particular in dependence on the operating and environmental conditions acting on the superposition drive (e.g. direction of rotation and its reversal, wear, temperature, air humidity). A change of the cooperation of the transmission components in turn can influence a development of noise caused by the superposition drive. This fact can be particularly critical when the superimposed steering system is to be used in the direct hearing range of a person, as it is the case when it is applied in the steering wheel of a motor vehicle.

From DE 10 2006 013 288 A1 a superposition apparatus for a superimposed steering system with an actuating device (electric motor) is known, which together with a worm shaft non-rotatably connected with the same is pivotally mounted on a transmission housing. By a biasing device engaging the end of the worm shaft facing away from the actuating device, which includes a coil spring under tension, the worm shaft is pulled against a worm gear and in this way the clearance between the tooth flanks thereof is brought to zero.

It may be a disadvantage of such an arrangement that upon occurrence of a force which acts against the force applied by the biasing device and exceeds the same, worm gear and worm shaft can be pressed apart (moved away from each other) and the clearance between the tooth flanks can exceed a critical measure.

SUMMARY

A problem underlying the invention consists in providing a superposition drive for a superimposed steering system of a motor vehicle, which provides for a tolerance compensation and at the same time operates as safely and reliably as possible.

According to the invention, there is provided a superposition drive for a superimposed steering system of a motor vehicle, comprising
a drive shaft;
a drive gear cooperating with the drive shaft, wherein the drive shaft is pivotally mounted with respect to the drive gear.

According to the invention, there is provided a lever element pivotally mounted with respect to the drive gear, which is designed and arranged such that pivoting of the lever element entails pivoting of the drive shaft, or vice versa pivoting of the drive shaft entails pivoting of the lever element.

The drive shaft in particular is formed in the form of a drive worm which meshes with a drive gear designed as worm gear. In particular, the drive shaft is driven by an actuator, wherein the actuator and the drive shaft form an arrangement which together is pivotally mounted about a common pivot axis with respect to the drive gear. It is possible in particular that the actuator (its actuator shaft) is connected with the drive shaft (or actuator shaft and drive shaft are designed in one piece), so that a swivel movement of the actuator effects a swivel movement of the drive shaft.

For example, the drive shaft is pivotally mounted on a housing of the superposition drive. The drive shaft also can indirectly be pivotally mounted on the housing of the superposition drive, in particular due to the fact that the actuator connected with the same is pivotally arranged on the housing of the superposition drive.

According to a further aspect of the invention, the drive shaft is pivotally mounted with respect to the drive gear about a pivot axis which at least approximately extends parallel to the axis of rotation of the drive gear and/or vertically to the axis of the drive shaft.

The pivotal bearing of the drive shaft is effected via the (in particular oblong) lever element pivotally mounted with respect to the drive gear. The lever element is designed and arranged such that pivoting of the lever element entails pivoting of the drive shaft or vice versa (in particular, the lever element is fixed with respect to the drive shaft). For example, the lever element is pivotally mounted on the housing of the superposition drive, as will be explained below.

The lever element in addition can be firmly connected with the actuator for driving the drive shaft or be formed as part of the actuator. In particular, the lever element is (e.g. integrally) connected with a housing of the actuator. The lever element for example is arranged and designed such that it forms a first lever arm pivotable about a pivot point (or about a pivot axis), wherein a second lever arm extends from the pivot point up to a point at which the drive shaft (e.g. in the form of a drive worm) engages into the drive gear (e.g. in the form of a worm gear). The pivot axis in particular extends through the actuator (in particular through its housing) or is located, as seen along the axis of rotation of the drive shaft, between the actuator and the drive gear (or the point of engagement of drive shaft and drive gear).

The superposition drive according to the invention thus includes a double-ended lever. In dependence on the distance between the pivot axis of the lever element and the point of engagement between the drive worm and the worm gear, parts of the actuator also are to be assigned to the second lever arm.

According to another development of the invention, the lever element supports on a housing of the superposition drive via at least one elastic element or on a component fixed at the housing of the superposition drive. The component fixed at the housing of the superposition drive thus is a component firmly mounted on the steering wheel and not movable relative to the housing of the superposition drive. The elastic element in particular is formed in the form of a spring, e.g. in the manner of a coil spring, elastomer spring or disk spring. For the elastic element any material can be used, which is reversibly deformed under load and on removal of the load returns into its original shape.

In dependence on the design of the elastic element and the geometrical conditions in its region of arrangement (in particular depending on the distance between the lever element and the housing of the superposition drive or to the component fixed at the housing of the superposition drive), the elastic element can introduce a defined force into the lever element, which generates a torque with respect to the pivot axis which acts on the actuator and hence on the drive shaft and which presses the drive shaft (via the second lever arm) against the drive gear with an (in particular predeterminable) pressing force.

It is also conceivable theta first and a second elastic element are provided, wherein the first elastic element is arranged between a first side of the lever element and the housing of the superposition drive or the component fixed at the housing, and the second element is located on a second side of the lever element which faces away from its first side. The first and the second elastic element, which each can be designed e.g. in the form of a spring, as mentioned above, however need not be identical. It rather is conceivable that they differ for example with regard to their type or at least with regard to their elasticity characteristic (in particular with regard to their spring constants).

In a starting position, the lever element for example is arranged at a distance from the housing of the superposition drive or the component fixed at the housing, wherein the housing of the superposition drive or the component connected with the housing in particular limits a swivel movement of the lever element. In this way, forces introduced into the drive gear via the second lever arm (i.e. in particular via the drive shaft) both in clockwise and in anticlockwise direction at the point of engagement of the drive shaft into the drive gear can be balanced and (if present) be compensated by the above-mentioned elastic elements (or the plurality of elastic elements). The forces introduced into the drive gear vary during the operation of the superposition drive for example due to dimensions and engagement relations (e.g. distance and/or angle between drive shaft and drive gear) changing in dependence on the existing operating and environmental conditions (drive forces, wear, temperature, air humidity, etc.).

Via a pin, the lever element can be pivotally mounted on a housing of the superposition drive, wherein the pin in particular reaches through through-bores in the housing and in the lever element.

The pin is formed e.g. in the form of an eccentric pin which with a first portion reaches through the lever element and with a second portion reaches through the housing of the superposition drive, wherein a middle axis of the first portion defines the pivot axis and a middle axis of the second portion defines a bearing axis, and wherein the pivot axis extends at a distance to the bearing axis. In particular, the first portion of the eccentric pin has a larger diameter than the second portion.

In the case of a rotation of the eccentric pin about the bearing axis, the pivot axis thus moves on a circular path about the bearing axis. The eccentric pin therefore can serve to preset the distance between the drive shaft and the drive gear, i.e. the engagement (the engagement relations) between drive shaft and drive gear. In addition, a locking arrangement can be present, via which the eccentric pin can be locked in a desired, presettable angular position in the housing of the superposition drive.

The invention also relates to a superimposed steering system which includes a superposition drive as described above.

DETAILED DESCRIPTION OF THE DRAWINGS

The invention will subsequently be explained in detail by means of exemplary embodiments with reference to the Figures.

DETAILED DESCRIPTION

Figure 1:
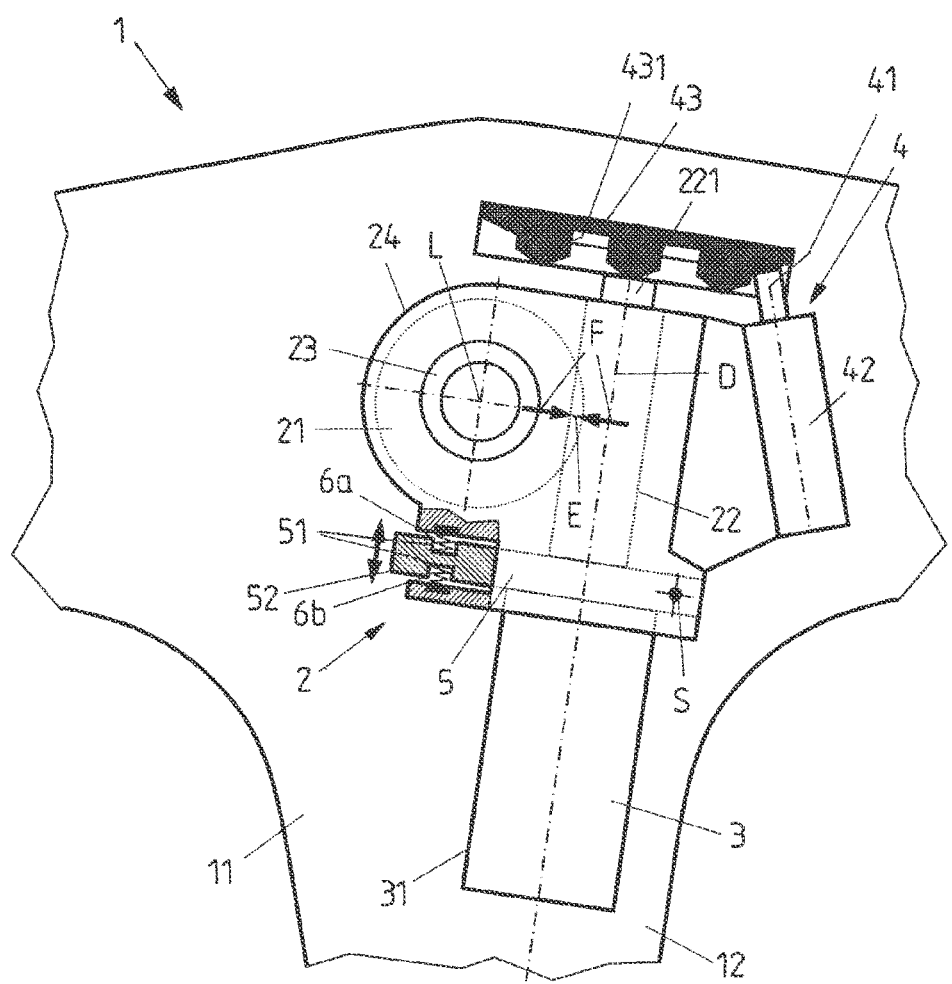
FIG. 1 shows a superposition drive arranged in a steering wheel of a motor vehicle according to an exemplary embodiment of the invention.

FIG. 1 shows a superposition drive 2 arranged on a central hub 11 of a steering wheel 1 of a motor vehicle for realizing a superimposed steering system. Via spokes 12 (here three), the steering wheel hub 11 is connected with a non-illustrated steering wheel rim, by means of which a driver can rotate the steering wheel 1 and thus impose a steering angle on a steering shaft (with axis L) connected with the steering wheel 1. By means of the superposition drive 2 an additional steering angle can be imposed on the steering shaft, which is superimposed on the steering angle introduced into the steering shaft by rotating the steering wheel rim.

The superposition drive 2 in particular is arranged on a side of the steering wheel 1 facing away from the driver and includes a drive shaft formed as drive worm 22, which meshes (is in engagement) with a drive gear in the form of a worm gear 21. The worm gear 21 is coupled with the steering shaft of the motor vehicle via a tab 23 which protrudes from a housing 24 of the superposition drive 2, so that a rotary movement of the worm gear 21 is transmitted to the steering shaft.

In FIG. 1, the common axis of rotation L of worm gear and steering shaft extends vertically to the drawing plane. The drive of the drive worm 22 is effected via an actuator 3, which in particular is formed in the form of an electric motor. An actuator shaft (not shown) of the actuator 3 is firmly (e.g. integrally) connected with the drive worm 22. A possible configuration of the superposition drive 2 and its attachment to the steering wheel 1 and with the steering shaft are described e.g. in WO 2010/11 57 07 A1, to which reference in so far is made expressly.

At the steering wheel 1, there is furthermore arranged a locking device 4 separate from the superposition drive 2, which serves to lock the superposition drive 2 by mechanical action; for example to prevent an introduction of a steering angle into the steering shaft by the superposition drive 2 in the case of a malfunction of the superposition drive 2.

The locking device 4 includes a locking element in the form of a locking bolt 41, which via an (e.g. electromagnetic) actuator 42 is axially movable from a release position into the locking position shown in FIG. 1. In its locking position, the locking bolt 41 cooperates with a rotatable element in the form of a locking disk 43, wherein the locking disk 43 is non-rotatably coupled with a free end 221 of the drive worm 22 protruding from the housing 24 of the superposition drive 2. Along its outer circumference, the locking disk 43 includes cutouts 431 into which a free end of the locking bolt 41 engages and chiefly positively locks the locking disk 43, so that the drive worm 22 coupled with the locking disk 43 also is blocked.

Together with the drive worm 22 the actuator 3 of the superposition drive 2 is pivotally (oscillatingly) mounted on the housing 24 of the superposition drive 2 about an axis S. Correspondingly, the drive worm 22 can perform a swivel movement relative to the worm gear 21. The pivot axis S, as seen along the common axis of rotation D of drive worm 22 and actuator shaft, preferably extends between the drive worm 22 and the actuator 3; in particular in the region of an end of the actuator 3 facing the drive worm 22, wherein the pivot axis S extends through a portion of the housing 24 of the superposition drive 2.

The pivotal bearing of the actuator 3 and the drive worm 22 is realized by a lever element 5 at least substantially fixed with respect to the drive worm 22, i.e. at least substantially not movable relative to the drive worm 22, pivotable about the pivot axis S. The pivot axis S extends through the oblong lever element 5 in the region of an end of the same. The lever element 5 is firmly connected with the actuator 3. Alternatively, it can also be formed as part of the actuator 3, in particular as part of a housing 31 of the actuator 3.

The lever element 5 forms a first lever arm, wherein a second lever arm extends from the pivot axis S up to a point E at which the drive worm 22 engages into the worm gear 21. The pivotal bearing of the actuator 3 and the drive worm 22 thus comprises the formation of a double-ended lever with the lever element 5 as first lever arm and the second lever arm which substantially extends between the actuator 3 and the point E of the engagement of the drive worm 22 into the worm gear 21 (and at least substantially along the drive worm 22). In dependence on the distance of the pivot axis S from the point E of the engagement between drive worm 22 and worm gear 21, parts of the actuator 3 also can be assigned to the second lever arm.

The lever element 5 supports on the housing 24 of the superposition drive 2 via two elastic elements in the form of two spring elements 6a, 6b. It is also conceivable that the lever element 5 supports on a component firmly connected with the housing 24 via the spring elements 6a, 6b, i.e. the spring elements 6a, 6b are located between the lever element 5 and the component. The spring elements 6a, 6b also are arranged on different sides of a free end 52 of the lever element 5. In particular, the lever element 5 forms two cutouts 51 in which the spring elements 6a, 6b are accommodated.

Depending on the design of the spring elements 6a, 6b and on the geometrical conditions in their region of arrangement (i.e. in particular depending on the dimensions of the cutouts 51 and the distance of the free end 52 of the lever element 5 from the housing 24) a defined force is introduced into the lever element 5 by the spring elements 6a, 6b, which with respect to the pivot axis S exerts a torque on the actuator 3 and hence also on the drive worm 22 in anticlockwise direction, and via the second lever arm (see above) correspondingly generates a certain pressing force F between the drive worm 22 and the worm gear 21, so that the drive worm 22 and the worm gear 21 have the tendency to remain in engagement with each other.

As an alternative to the arrangement of the spring elements 6a, 6b, the lever element 5 itself can at least partly be designed as elastic element, e.g. in the form of a flexible spring, and likewise support on the housing 24 of the superposition drive 2. In such a case, adjustable fixed stops additionally can be provided at the housing 24 on the different sides of the free end 52 of the lever element 5. The above-described generation of a certain pressing force F between the drive worm 22 and the worm gear 21 thus also becomes possible.

Figure 2:
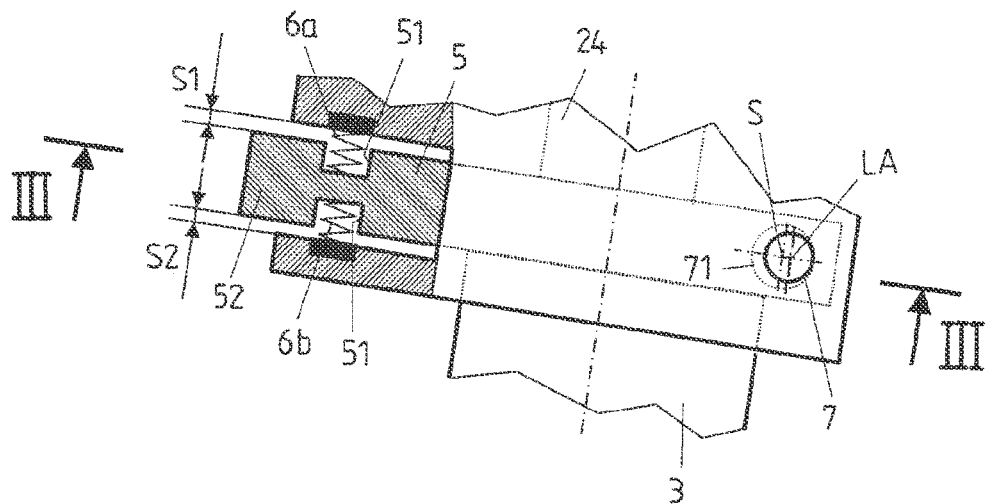
FIG. 2 shows an enlarged section of FIG. 1.

FIG. 2 shows an enlarged section of the superposition drive of FIG. 1 in the region of the lever element 5. The spring elements 6a, 6b here are shown as coil springs; however, this representation merely has a symbolic character. Any other type of spring element (e.g. an elastomer spring or a disk spring) likewise is possible for realizing the spring elements 6a, 6b. In addition, the spring elements 6a, 6b arranged on different sides of the lever element 5 need not be formed identical. Rather, it is also possible that different spring elements are used; e.g. spring elements of a different type and/or with different force-path characteristic.

In its starting position shown in FIG. 2 (superimposed steering system mounted in the steering wheel and vehicle and not in operation), the lever element 5 (i.e. the first lever arm of the pivotal bearing) on both sides has a specified distance S1, S2 to the respective portion of the housing 24 on which the spring elements 6a, 6b support. Thus, at the point E of the engagement (FIG. 1) of drive worm 22 and worm gear 21 forces introduced via the second lever arm (i.e. in particular via the drive worm 22) both in clockwise and in anticlockwise direction (in particular into the region of the worm gear 21 cooperating with the drive worm 22 or vice versa into the region of the drive worm 22 cooperating with the worm gear 21) can be balanced and be compensated by the spring elements 6a, 6b exerting corresponding counterforces. The introduced forces mentioned above vary in particular during the operation of the superposition drive 2 due to measures and engagement relations changing in dependence on the existing operating and environmental conditions (forces, wear, temperature, air humidity, etc.). When the introduction of forces at the second lever arm is effected in clockwise direction (i.e. the lever element 5 is pivoted towards the worm gear 21), the upper spring element 6a as shown in FIG. 2 is compressed. When the lever element 5 on the other hand is pivoted away from the worm gear 21, the lower spring element 6b is compressed.

By the selection of the spring elements 6a, 6b and the constructive design of the lever element 5 and the region of the support of the spring elements 6a, 6b on the housing 24 of the superposition drive 2 the distances S1, S2 between the free end 52 of the holding element 5 and the housing 24 each are fixed and a basic setting of the holding element 5 thus is defined. In dependence on the existing requirements (in particular for the desired clearance between drive worm 22 and worm gear 21) the distances S1, S2 also can be chosen differently.

During the introduction of forces at the second lever arm (in particular at the drive worm 22), which (in particular due to the toothing geometry) have the tendency to urge the drive worm 22 away from the worm gear 21 (i.e. when pivoting the lever element in clockwise direction with respect to FIGS. 1, 2, i.e. towards the worm gear 21), the clearance (the distance) between the tooth flanks of the toothing of the worm gear 21 and the drive worm 22 can exceed a critical measure. To prevent this (i.e. to prevent that the toothings of the worm gear 21 and the drive worm 22 get out of engagement), the upper distance S1 is dimensioned such that the lever element 5 (the first lever arm) comes to rest against the supporting region of the housing 24 of the superposition drive 2 associated to the upper spring element 6a, and thus further pivoting of the lever element 5 is counteracted, before the worm gear 21 and the drive worm 22 get out of engagement.

On the other hand, a torque acting in anticlockwise direction (i.e. the lever element 5 is pivoted away from the worm gear 21) in particular can be compensated by correspondingly designing the lower distance S2 and the lower spring element 6b. In this connection, reference is made to another issue: As shown in FIG. 1, behind the region E of the engagement with the worm gear 21 as seen from the actuator 3, the drive worm 22 does not have an additional bearing point. The drive worm 22 merely is supported in the actuator 3 via the actuator shaft (bearing not shown).

For this reason, the drive worm 22 can be designed as further spring element (i.e. the drive worm 22 is at least sectionally designed elastic to a certain extent), which after a contact of the free end 52 of the lever element 5 with the housing 24 of the superposition drive 2 is subjected to bending within an elastic region. With this design of the drive worm 22, the spring element 6a or the spring element 6b and the drive worm 22 can be regarded as two series-connected springs, wherein the spring constant of the drive worm 22 designed as spring element in particular is much higher than that of the spring elements 6a, 6b.

The spring elements 6a, 6b at least substantially effect the forces acting in "normal" driving operation at the point E of the engagement of drive worm 22 and worm gear 21 (minimum and maximum pressing forces). Upon exceedance of these forces in extreme situations (e.g. initiation of fast changes in the direction of rotation at the steering wheel), the drive worm 22 designed as further spring element acts as additional elastic support at a high force level.

For mounting the lever element 5 in the housing 24 of the superposition drive 2, both the lever element 5 and the housing 24 are provided with through-bores 53, 241, wherein a fastening element formed as eccentric pin 7 reaches through the through-bores 53, 241. By means of the eccentric pin 7 a pivotal bearing of the lever element 5 at the housing 24 thus is effected (cf. also FIG. 3, which shows a section along the plane III-III in FIG. 2).

The eccentric pin 7 includes a middle portion 71 which extends in the through-bore 53 of the lever element 5 and thus in the interior of the housing 24, and which as compared to an upper and a lower portion 72, 73 of the eccentric pin 7 has a larger diameter. The middle axis of the middle portion 71 defines the pivot axis S about which the actuator 3 and the drive worm 22 are rotatable, while the middle axes of the upper and the lower portion 72, 73 of the eccentric pin 7, which reach through the through-bores 241 of the housing 24, define a bearing axis LA. The bearing axis LA and the pivot axis S thus extend at a distance to each other, so that in the case of a rotation of the eccentric pin 7 about the bearing axis LA the pivot axis S moves around the bearing axis LA on a circular path.

It is conceivable that the superposition drive 2 includes a locking arrangement (not shown) with which the eccentric pin 7 can be locked in a desired initial angular position in the housing 24 of the superposition drive 2. Thus, the eccentric pin 7 provides for presetting the engagement (the engagement relations) between the drive worm 21 and the worm gear 22, i.e. in particular the distance (the clearance) between these two components.

Figure 3:
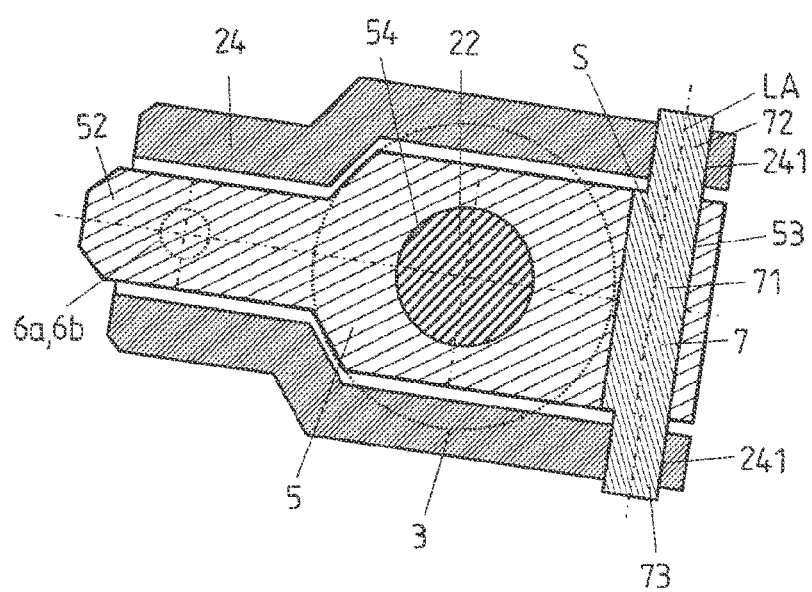
FIG. 3 shows a section through the superposition drive along the plane III-III in FIG. 2.

In FIG. 3, the spring elements 6a, 6b, the actuator 3 and the drive worm 22 (or the drive shaft of the actuator 3) also are indicated. It can also be seen that the lever element 5 firmly connected with the actuator 3 or formed as part thereof includes a through-bore 54 which is reached through by the drive worm 22 or by the drive shaft of the actuator 3.

The through-bore 54 is located in a portion of the holding element 5 which as compared to the free end 52 has a larger diameter or (with a non-rotationally symmetrical design of the holding element 5) at least a larger extension in vertical direction (parallel to the axis of rotation L of the worm gear). The lever element 5 is formed e.g. as part of the actuator housing 31, so that it is fixed with respect to the drive shaft of the actuator 3 and hence with respect to the drive worm 22 and pivoting of the lever element 5 effects pivoting of the drive worm 22.

It should be noted that the described arrangement, in which the lever element 5 as first lever arm and the second lever arm extend substantially at right angles to each other, is to be understood merely by way of example. Rather, the invention generally can comprise a double-ended lever arrangement, wherein the position of the lever arms relative to each other is of minor importance and largely depends on the existing installation conditions. What is also conceivable, for example, is an arrangement in which drive worm 22 and lever element 5 extend in alignment with the axis of rotation D of the drive worm 22 (i.e. extend at an angle of 180° to each other), and in which furthermore the pivot axis S extends through the axis of rotation D.

LIST OF REFERENCE NUMERALS 1 steering wheel
2 superposition drive
3 actuator
4 locking device
5 holding element
6a, 6b spring element
7 eccentric pin
11 steering wheel hub
21 worm gear
22 drive worm
23 tab
24 housing
31 actuator housing
41 locking bolt
42 actuator of locking device
43 locking disk
51 cutout
52 free end
53 through-bore
54 through-bore
71 middle portion of eccentric pin
72 upper portion of eccentric pin
73 lower portion of eccentric pin
221 free end of drive worm
241 through-bore
431 cutout
L axis of rotation of steering shaft
S pivot axis
E point of engagement of worm gear into drive worm
D axis of rotation of drive worm
LA bearing axis
S1, S2 distance holding element housing

The invention claimed is:
1. A superposition drive for a superimposed steering system of a motor vehicle, comprising
    a drive shaft;
    a drive gear cooperating with the drive shaft, wherein the drive shaft is pivotally mounted with respect to the drive gear, and
    a lever element pivotally mounted with respect to the drive gear, which is designed and arranged such that pivoting of the lever element entails pivoting of the drive shaft, or vice versa pivoting of the drive shaft entails pivoting of the lever element, wherein the drive shaft is driven by an actuator, wherein the actuator and the drive shaft form an arrangement whish is pivotally mounted with respect to the drive gear via the lever element.

2. The superposition drive according to claim 1, wherein the actuator is connected with the drive shaft.

3. The superposition drive according to claim 1, wherein the drive shaft is pivotally mounted on a housing of the superposition drive.

4. The superposition drive according to claim 1, wherein the lever element is connected with the actuator or formed as part of the actuator.

5. The superposition drive according to claim 4, wherein the lever element is connected with a housing of the actuator.

6. The superposition drive according to claim 1, wherein the lever element is pivotally mounted about a pivot axis, wherein the lever element forms a first lever arm and a second lever arm extends from the pivot axis up to a point at which the drive shaft engages into the drive gear.

7. The superposition drive according to claim 1, wherein the lever element supports on a housing of the superposition drive via at least one elastic element or on a component fixed at the housing of the superposition drive.

8. The superposition drive according to claim 7 wherein in a starting position the lever element is arranged at a distance from the housing of the superposition drive or the component fixed at the housing.

9. The superposition drive according to claim 8, wherein the housing of the superposition drive or the component connected with the housing limits a swivel movement of the lever element.

10. The superposition drive according to claim 1, wherein the lever element is pivotally mounted on a housing of the superposition drive via a pin.

11. The superposition drive according to claim 10, wherein the pin is formed in the form of an eccentric pin which with a first portion reaches through the lever element and with a second portion reaches through the housing of the superposition drive, wherein a middle axis of the first portion defines the pivot axis and a middle axis of the second portion defines a bearing axis, and wherein the pivot axis extends at a distance to the bearing axis.

12. A steering wheel with a superimposed steering system, which includes a superposition drive according to claim 1.

13. A superposition drive for a superimposed steering system of a motor vehicle, comprising
a drive shaft;
a drive gear cooperating with the drive shaft, wherein the drive shaft is pivotally mounted with respect to the drive gear, and
a lever element pivotally mounted with respect to the drive gear, whish is designed and arranged such that pivotally of the lever element entails pivoting of the drive shaft, or vice versa pivoting of the drive shaft entails pivoting of the lever elements,
wherein the drive shaft is pivotally mounted with respect to the drive gear about a pivot axis, which at least approximately extends parallel to the axis of rotation of the drive gear or vertically to the axis of the drive shaft.

14. A superposition drive for a superimposed steering system of a motor vehicle, comprising
a drive shaft;
a drive gear cooperating with the drive shaft, wherein the first is pivotally mounted with respect to the drive gear, and
a lever element pivotally mounted with respect to the drive gear, whish is designed and arranged such that pivoting of the lever element entails pivoting of the drive shaft, or vice versa pivoting of the drive shaft entails pivoting of the lever element,
wherein the lever element supports or on a housing of the superposition drive via at least a first and a second elastic element or on a component fixed at the housing of the superposition drive,
wherein the first elastic element is arranged between a first side of the lever element and the housing or the component fixed at the housing, and the second elastic element is located on a second side of the lever element, which faces away from the first side.

* * * * *

UNITED STATES PATENT AND TRADEMARK OFFICE
CERTIFICATE OF CORRECTION

PATENT NO.         : 9,499,191 B2
APPLICATION NO.    : 14/410034
DATED              : November 22, 2016
INVENTOR(S)        : Thomas Marotzke Page 1 of 1

It is certified that error appears in the above-identified patent and that said Letters Patent is hereby corrected as shown below:

In the Specification
Column 1, Line 12, delete "645.5" and insert -- 640.5 --, therefor.

In the Claims
Column 9, Line 5, delete "whish" and insert -- which --, therefor.
Column 10, Line 13, delete "whish" and insert -- which --, therefor.
Column 10, Line 14, delete "pivotally" and insert -- pivoting --, therefor.
Column 10, Line 16, delete "elements," and insert -- element, --, therefor.
Column 10, Line 25, delete "first" and insert -- drive shaft --, therefor.
Column 10, Line 28, delete "whish" and insert -- which --, therefor.
Column 10, Line 32, after "supports" delete "or", therefor.

Signed and Sealed this
Twenty-fifth Day of April, 2017

Michelle K. Lee
*Director of the United States Patent and Trademark Office*